(12) United States Patent
Badalone

(10) Patent No.: US 8,081,677 B2
(45) Date of Patent: Dec. 20, 2011

(54) RECEIVER-BASED ADAPTIVE EQUALIZER WITH PRE-CURSOR COMPENSATION

(75) Inventor: Riccardo Badalone, Saint-Lazare (CA)

(73) Assignee: Diablo Technologies Inc., Gatineau, Quebec (CA)

( * ) Notice: Subject to any disclaimer, the term of this patent is extended or adjusted under 35 U.S.C. 154(b) by 768 days.

(21) Appl. No.: 11/720,024

(22) PCT Filed: Nov. 22, 2005

(86) PCT No.: PCT/CA2005/001765
§ 371 (c)(1),
(2), (4) Date: Jan. 9, 2008

(87) PCT Pub. No.: WO2006/056048
PCT Pub. Date: Jun. 1, 2006

(65) Prior Publication Data
US 2008/0240223 A1    Oct. 2, 2008

(51) Int. Cl.
*H04L 27/01* (2006.01)
(52) U.S. Cl. .................................. 375/233; 375/232

(58) Field of Classification Search .............. 375/233, 375/232
See application file for complete search history.

(56) References Cited

U.S. PATENT DOCUMENTS

| 5,557,482 A | * | 9/1996 | Christensen et al. ........... 360/53 |
| 6,055,269 A | * | 4/2000 | Drost et al. .................... 375/232 |
| 7,272,177 B2 | | 9/2007 | Lin et al. |
| 2008/0260016 A1 | * | 10/2008 | Lapointe et al. .............. 375/233 |

* cited by examiner

*Primary Examiner* — Shuwang Liu
*Assistant Examiner* — Michael Neff

(57) ABSTRACT

An equalization circuit is disclosed that enables high data rate transmission over high loss communications channels. Also disclosed is a set of functional blocks and update criteria that allow for the equalization function to be adapted for a large variety of different communications channels. A fully continuous adaptive equalizer is used in conjunction with a Decision Feedback Equalizer to fully equalize a wide range of communications channels. Interoperability and Bit Error Rate performance are optimized through compensation of pre-cursor inter-symbol interference, which is performed adaptively in the receiver as opposed to the transmitter.

35 Claims, 6 Drawing Sheets

US 8,081,677 B2

RECEIVER-BASED ADAPTIVE EQUALIZER WITH PRE-CURSOR COMPENSATION

BACKGROUND OF THE INVENTION

1. Field of the Invention

The present invention relates generally to communications systems and more particularly to equalization apparatus and adaptation methods for automatically eliminating pre-cursor inter-symbol interference caused by a serial communication channel for a binary, Non-Return-to-Zero (NRZ), serial data stream without requiring transmit pre-equalization.

2. Description of the Related Art

Many communications and computing systems use serial transceivers to interconnect high bandwidth devices. The data bits of the communications and computing systems may be processed in groups, such as bytes or words, but transmitted as a series of bits. The serial transceivers separate and aggregate the bits in a device referred to as a Serializer/Deserializer (SerDes). In a typical Serializer/Deserializer (SerDes) application, the biggest challenge is to guarantee that every transmitted data bit is correctly received. In the case of backplane transceivers that must operate above 1 Gb/s data rates, the loss and dispersion characteristics of the channel make it so that a certain amount of signal conditioning is required in order to recover the channel impaired signal arriving at the receiver without error.

One form of channel impairment is inter-symbol interference, generally caused by dispersion of the signal as it travels along the channel. A data pulse travelling over a channel is dispersed or smeared by stretching the pulse such that it extends over a longer duration when it exits the channel than it extended when it was introduced into the channel. The stretched pulse can be thought of having pre-cursor and post-cursor distortions and these pre-cursor and post-cursor distortions result in inter-symbol interference. The inter-symbol interference caused by pre-cursor distortion can be easily corrected by using pre-emphasis in the transmitter, but for a fully adaptive system, this would require an out-of-band or in-band communication link between the receiver and the transmitter. Thus, a limitation of this system is the fact that the transmitter co-efficients must be updated and set as a function of the channel, and as such can only be adapted based on criteria that is obtained in the receiver. For the system to be fully adaptive, update information must be passed from the receiver to the transmitter in an out-of-band or in-band fashion.

However, providing such a communications link between the receiver and transmitter is unattractive in certain applications. For example, there may be interoperability issues in some applications that do not provide specific methods for receiver-to-transmitter communication.

SUMMARY OF THE INVENTION

The present invention provides a receiver based equalization apparatus and adaptation method for automatically eliminating pre-cursor inter-symbol interference caused by a serial communication channel for a binary, Non-Return-to-Zero (NRZ), serial data stream without requiring transmit pre-equalization.

A system in accordance with the principles of the present invention includes a receiver with an adaptive continuous equalizer.

One aspect of the present invention is that the adaptive continuous equalizer has an initial shaping filter with two signal paths. The first signal path is a pure broadband gain that can be adapted. The second signal path has a high pass filter that is cascaded with a broadband gain that can be adapted. The two signal paths are summed and represent the output of the initial shaping filter.

Another aspect of the present invention is that the adaptive continuous equalizer has a second shaping filter which uses the output of the first filter stage as an input. The second shaping filter has two signal paths. The first signal path is a pure broadband gain that can be adapted. The second signal path has a delay element cascaded with a broadband gain that can be adapted. The two signal paths are summed and represent the output of the adaptive continuous equalizer.

Another aspect of the present invention is that the output of the adaptive continuous equalizer may be combined with a DFE to enhance the performance of the overall equalizer, where the output of the adaptive continuous equalizer is used as an input to the DFE.

Another aspect of the present invention is that the DFE may have a plurality of symbol spaced co-efficients, where each co-efficient may be programmed independent of another co-efficient and or any of the adaptive continuous equalizer gains.

Another aspect of the present invention is that all the co-efficients and various stages of gain in the adaptive continuous equalizer in its entirety are all adapted based on time domain criteria extracted solely from the incoming data stream, where a co-efficient and gain update engine makes updates automatically and iteratively.

DETAILED DESCRIPTION OF THE INVENTION

In the context of an exemplary 10 Gb/s integrated circuit-type Serializer/Deserializer (SerDes), reference is made to the accompanying drawings, which form a part of the specific embodiment in which the invention may be practiced. It is to be understood that other embodiments may be utilized as structural changes may be made without departing from the scope of the present invention.

Figure 1A:
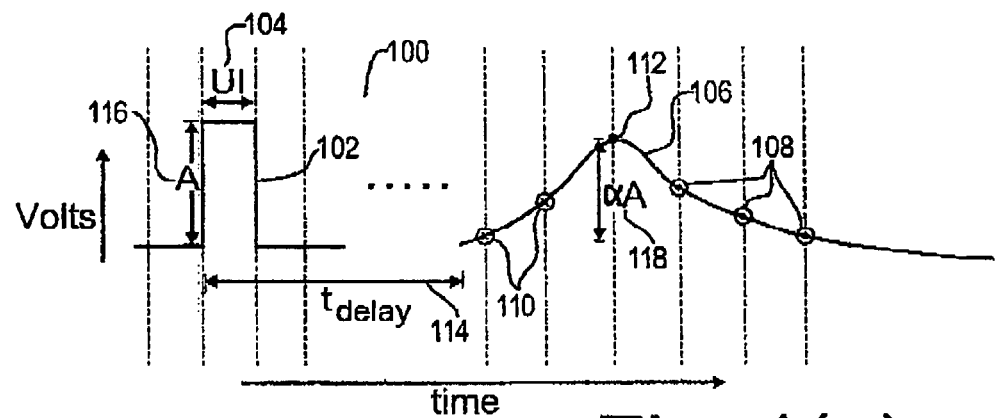
FIG. 1a illustrates effects of dispersion on a data pulse.

FIG. 1a illustrates the effect the channel has on a data pulse 102 with a given Unit Interval (UI) 104 and amplitude A 116. In addition to the data being delayed in time by a factor of $t_{delta}$ 114, the data channel will cause a temporal dispersion, or smearing, of the data pulse 102. The result will be a pulse 106, which has an amplitude 118 that will be scaled by $\alpha$, where $\alpha<1$, and a temporal duration which is greater than a single UI, such that the post-cursor elements 108 will affect bits that have not yet been sent, and pre-cursor elements 110 will mix with bits that have already been sent.

Figure 1B:
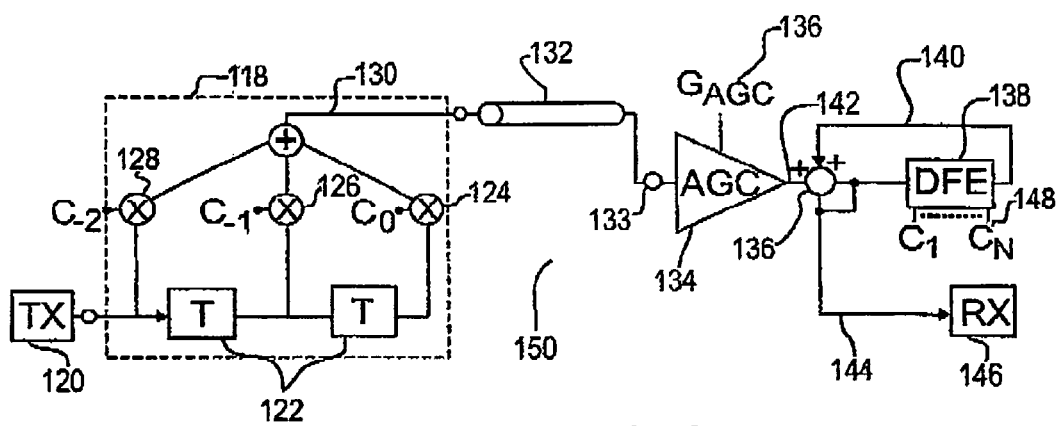
FIG. 1b illustrates a simplified block diagram of a system with transmit and receive equalization.

A basic SerDes system 150 is described in FIG. 1b, where a TX serial bit stream generated by a transmitter 120 is passed through a pre-emphasis filter 118 before being launched into the channel 132. The pre-emphasis driver will produce a filtered output 130 which will have been filtered to compensate for the effects of the pre-cursor dispersion 110. The co-efficients 124, 126 and 128, in combination with the cursor bit, first pre-cursor bit, and second pre-cursor bit respectively, will be used to pre-distort the output data stream 130 in such a way that the effects of the pre-cursor dispersion 110 will be cancelled. On the receiver side, a linear AGC 134 is cascaded with a DFE 138, where the DFE output 140 will be fed back and linearly added to the AGC output 142 to form the fully equalized data stream 144. Since the DFE is driven by decisions, which represent bits that have been sent prior to the cursor bit, its output 140 can be used to cancel the effects of the post cursor dispersion 108. The AGC gain 136 is set to scale the incoming data stream 133 such that when it is combined with the output of the DFE filter, the original signal amplitude is recovered. The combination of the pre-filtering in the transmitter and post filtering in the receiver allow for the signal pulse to be fully reshaped, where the dispersion caused by the channel can be completely eliminated.

Figure 2A:
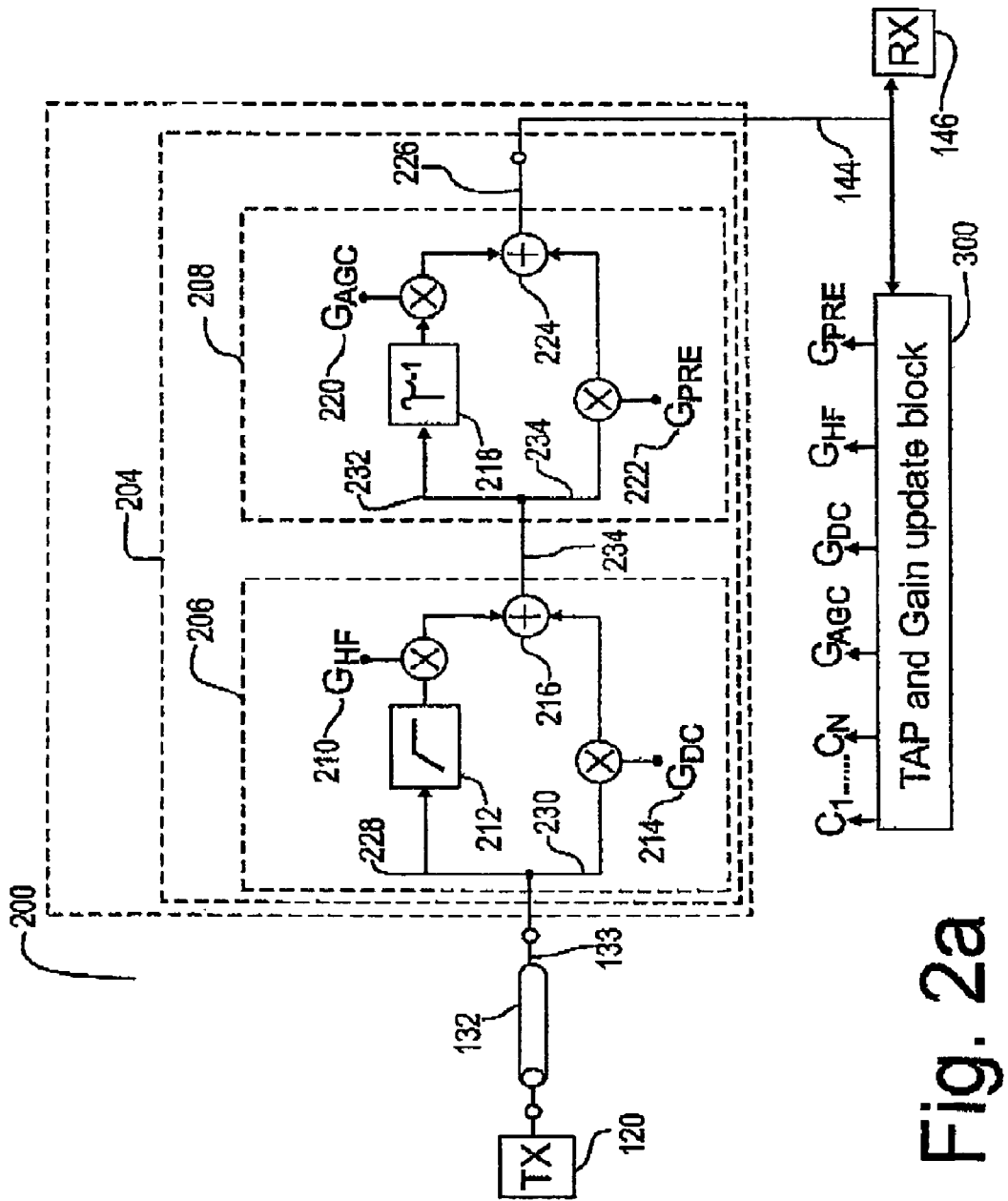
FIG. 2a illustrates a simplified block diagram of the equalization system in accordance with the present invention.

FIG. 2a illustrates a block diagram of the channel equalization apparatus in accordance with the present invention. The system 200 comprises of a transmitter driver 120, a non-ideal data channel 132, an adaptive equalizer 204, and a receiver block 146. The transmit driver 120 forwards the serial data stream through the channel 132 in a generic binary format and without pre-filtering.

The adaptive continuous equalizer 204 in FIG. 2a has two major components: a post-cursor equalizer 206 and a pre-cursor equalizer 208. The post-cursor equalizer 206 is constructed using the high-pass filter 212, programmable gain element $G_{DC}$ 214 and programmable gain element $G_{HF}$ 210. The pre-cursor equalizer 208 is constructed using the delay element 218, the programmable gain element $G_{AGC}$ 220 and programmable gain element $G_{PRE}$ 222.

The output of the channel 133 forms the input to the post-cursor stage, and is split into two concurrent paths as it enters 206. The data stream is scaled by $G_{DC}$ in the DC gain path 228. In the parallel high-pass path 230, the same data stream is filtered by 212 and scaled by $G_{HF}$. The output of 210 and 214 are summed at 216 to form the output of the post-cursor stage 234. The output 234 of the post-cursor stage 206 forms the input for the pre-cursor stage 208. The input to the pre-cursor stage is scaled by $G_{PRE}$ in the PRE gain path 234. In the AGC path 232, the data is delayed by a factor τ, where τ<UI. The delay signal is subsequently scaled by $G_{AGC}$. The output of 220 and 222 are summed at 224 to produce the output of the adaptive continuous equalizer 226.

Figure 2B:
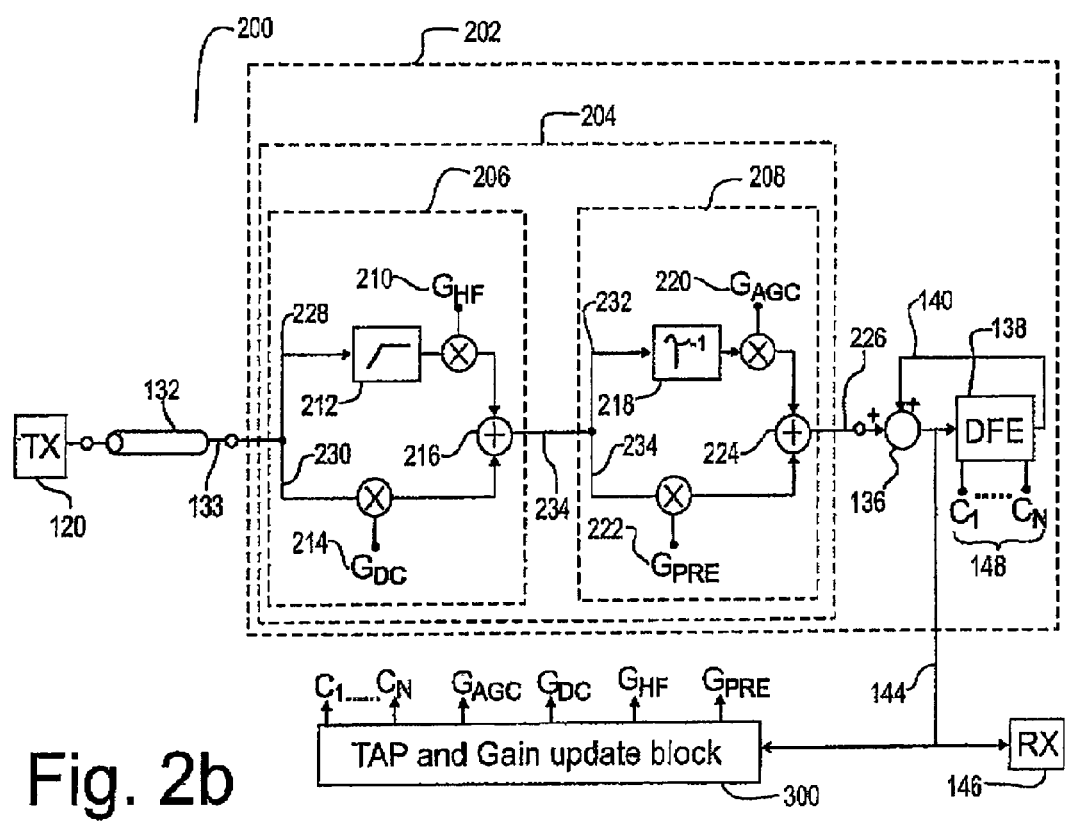
FIG. 2b illustrates a simplified block diagram of the adaptive continuous equalizer system coupled with a DFE in accordance with the present invention.

FIG. 2b shows the case where the adaptive continuous equalizer 204 is combined with an adaptive DFE filter 138 to produce an enhanced equalizer 202. The output of the adaptive continuous equalizer 226 may be summed with the feedback response 140 of the DFE 138 to produce a further equalized continuous data stream 144. The RX block 146 will process the equalized data stream 144.

The Co-Efficient and Gain Update block 300 takes in the serial bit stream 144, which it uses to calculate the updated co-efficient and gain values for the equalizer 204 and the enhanced equalizer 202. The Co-Efficient and Gain Update block 300, in accordance with the present invention, will use only time domain signal quality metrics to update the co-efficients and gains of the equalizer 204 and enhanced equalizer 202, without the requirement of performing any frequency domain analysis on the incoming data stream. It is sufficient to obtain limited information about the data amplitude and the actual recovered bit stream to adapt and converge either the equalizer 204 or the enhanced equalizer 202.

Figure 3:
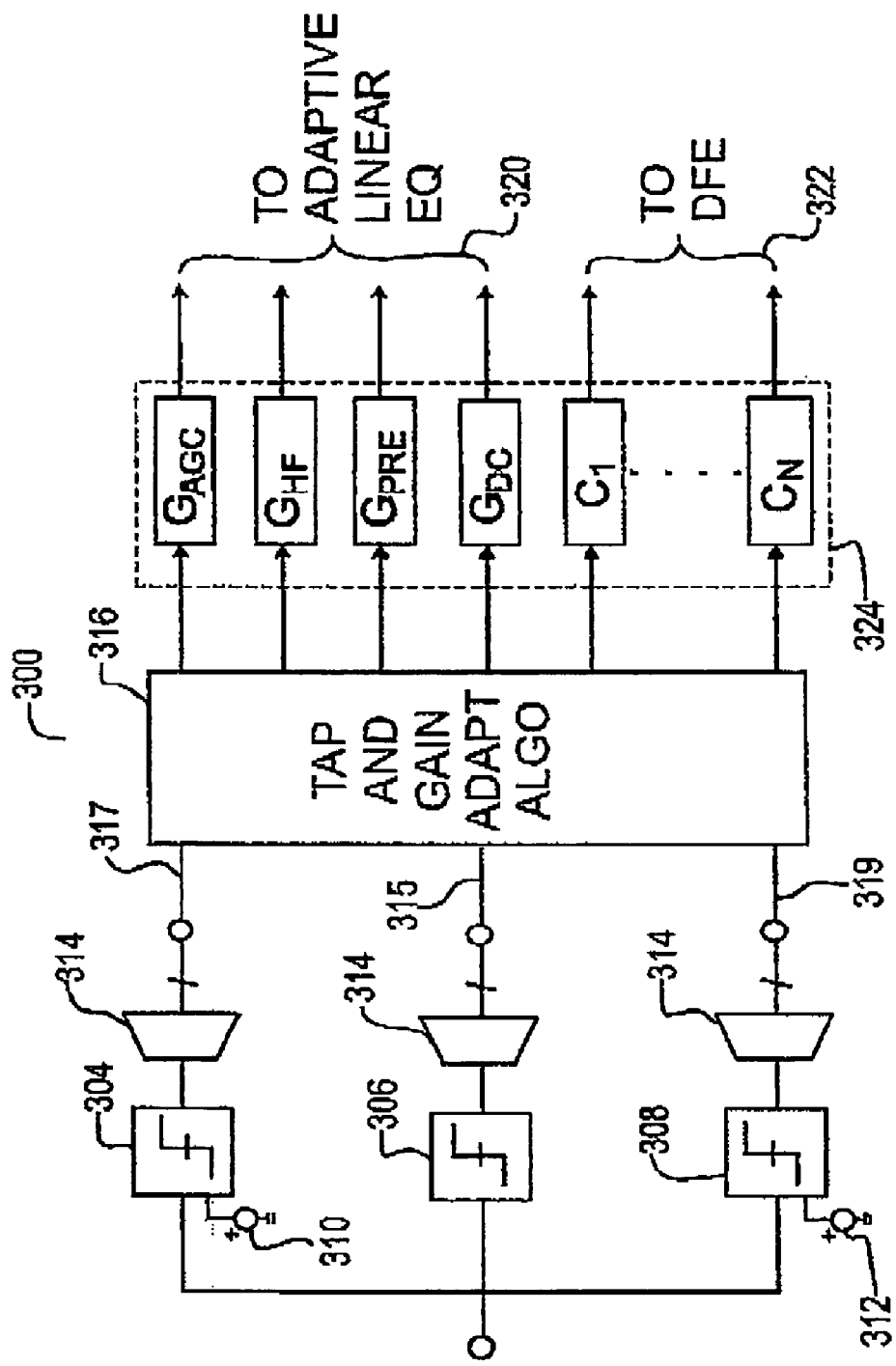
FIG. 3 illustrates a block diagram of the Co-Efficient and Gain Update block in accordance with the present invention.

FIG. 3 shows a more detailed block diagram of the Co-Efficient and Gain Update block 300. Three (3) slicers 306, 304, and 308 are used to sample the incoming data stream. Slicers 304 and 308 are configured to sample data with a positive voltage offset 310 and negative voltage offset 312 respectively, while slicer 306 slices the input data stream at the optimum voltage with no offset applied. The offsets 310 and 312 represent the desired or target signal amplitude against which the actual signal amplitude will be compared against. The output of the slicers 304 and 308 will generate information about the amplitude of the signal. The use of three (3) slicers, conceptually, ensures that enough information about the amplitude of the signal is obtained for every bit that is sampled by the system. The proposed system conceptually embodies the most basic method for extracting the necessary update criteria from the data stream. The use of fewer than three (3) slicers, or more than three (3) slicers, would constitute a subset of the functionality described herein.

Figure 4:
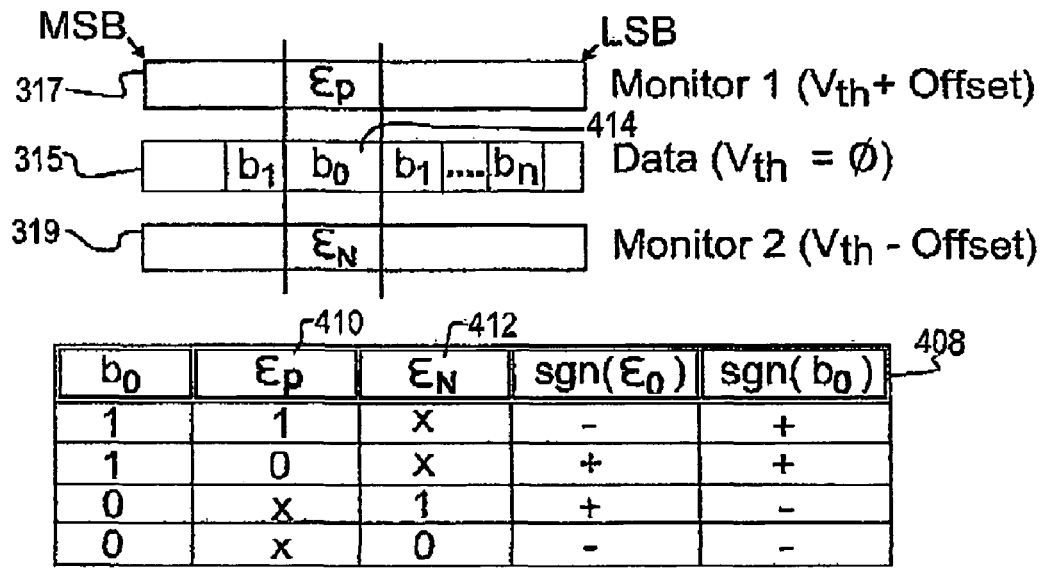
FIG. 4 outlines Co-Efficient and Gain update equations in accordance with the present invention.

The decisions of each slicer are de-multiplexed into parallel data streams, namely data stream 315, and two monitor streams 317 and 319, which correspond to slicer decisions made by 306, 304, and 308 respectively. All three (3) parallel data streams are stored in a separate storage array, and subsequently fed into the Co-Efficient and Gain Adaptation logic 316. The adaptation logic uses a set of equations to generate updates to the Co-Efficient and Gains of the equalizer 204 and the enhanced equalizer 202. The equations used in the update logic are defined in FIG. 4, and they require information from the three (3) sets of data words stored in separate storage arrays in order to produce update information for the co-efficients and gains 324 that are used in the equalizer 202 and the enhanced equalizer 202 described in FIG. 2a and FIG. 2b respectively.

For this discussion, the de-multiplexing ratio used to generate the data words 315, 317, 319 is arbitrary. It is only necessary to state that the order of the bits in each de-multiplexed word is preserved, such that the least significant bit in the word is the first bit latched, and the most significant word is the last bit latched. In order to adapt the system described in 200, specific information about the incoming data stream must be extracted. The most straight-forward method of extracting the information required is to latch three sets of data, where the first word 317 represents the data latched using a slicer 304 that has a positive voltage offset 310, the second word 315 represents the data latched using a slicer 306 with no voltage offset, and the third word 319 represents the data latched using a slicer 308 that has a negative voltage offset 312.

The co-efficient and gain updates are based on an approximation of the Least Mean Squares criterion, which is defined by the following equation:

$$C_x' \leftarrow C_x + \mu \times e \times Dx. \qquad \text{Equation 1}$$

Since the target systems are based on digital signaling, the actual analog values required to perform the exact co-efficient update are not readily available. However, the update equation may be approximated and simplified to take advantage of the binary nature of the data stream.

The decimal parameter $D_x$ in Equation 1 refers to the amplitude of a given data bit x. $D_x$ may be reduced to the polarity of the received data bit $b_x$. In a binary NRZ system the decision threshold for the data slicer has no voltage offset at the input. The data signal polarity is then defined by $sgn(b_x)$. The value of $sgn(b_x)$ is defined in table 409 of FIG. 4. If the data bit is larger than the decision threshold and has a binary value "1", then the polarity is defined as $sgn(b_x)=+1$. If the data bit is smaller than the decision threshold and has a binary value "0", then the polarity is defined as $sgn(b_x)=-1$. When specifically associated to the cursor, or data bit of reference for the update equations of filter co-efficients and gains, $sgn(b_x)=sgn(b_0)$.

The decimal parameter $\epsilon$ can be reduced to the polarity of the difference between the target signal amplitude and the actual signal amplitude for a given sampled data bit, and can be defined by $sgn(\epsilon)$. If the actual data signal is a smaller value than the desired or target signal value, then $sgn(\epsilon)=+1$. If the actual data signal is larger than the desired or target signal value, then $sgn(\epsilon)=-1$. When specifically associated with a selected cursor, or data bit of reference for the update equations of filter co-efficients and gains, $sgn(\epsilon)=sgn(\epsilon_0)$.
Equation 1 can then be simplified to:

$$C_x' \leftarrow C_x + \mu \times sgn(\epsilon_0) \times sgn(b_x). \quad \text{Equation 2}$$

A bit within the data word 315 may arbitrarily be selected to represent the cursor ($b_0$) 414, which will in turn provide the reference point from which to compute the $sgn(b_x)$ parameters for any update equation, and will also provide a bit location to extract the corresponding $sgn(\epsilon)$ information from the monitor channel outputs 317 and 319. The bits in the words 317 and 319 contain $sgn(\epsilon)$ information for all the bits contained in 315, thus by extracting the bits from 317 and 319 which have the same bit location as 414, the $sgn(\epsilon)$ information for the cursor bit $b_0$ can be extracted. Table 408 may then be used to determine the value of $sgn(\epsilon_0)$. If the cursor 414 from 315 has a positive polarity, then the corresponding $sgn(\epsilon)$ bit from 317 is relevant. If the cursor 414 from 315 has a negative polarity, then the corresponding $sgn(\epsilon)$ bit from 319 is relevant.

Update equations for the post-cursor equalizer stage are derived as a function of the filter architecture. Instead of adapting the post-cursor equalizer stage based on a frequency domain analysis, updates for $G_{HF}$ 220 and $G_{DC}$ 214 are performed using time domain information about the polarity of cursor $b_0$, the polarity of the difference between the desired amplitude of cursor $b_0$ and the actual receive signal amplitude, and the polarity of the first post-cursor $b_1$. The equations 416 and 414 are used to update $G_{HF}$ 220 and $G_{DC}$ 214 respectively, and are defined as:

$$G_{HF}' \leftarrow G_{HF} - \mu \times sgn(\epsilon_0) \times sgn(b_1). \quad \text{Equation 3}$$

$$G_{DC}' \leftarrow G_{DC} + \mu \times sgn(\epsilon_0) \times sgn(b_0). \quad \text{Equation 4}$$

Update equations for the pre-cursor equalizer stage are derived as a function of the filter architecture. Instead of adapting the pre-cursor equalizer stage based on a frequency domain analysis, updates for $G_{AGC}$ 210 and $G_{PRE}$ 222 are performed using time domain information about the polarity of cursor $b_0$, the polarity of the difference between the desired amplitude of cursor $b_0$ and the actual receive signal amplitude, and the polarity of the first pre-cursor $b_{-1}$. The equations 412 and 418 are used to update $G_{AGC}$ 210 and $G_{PRE}$ 222 respectively, and are defined as:

$$G_{AGC}' \leftarrow G_{AGC} + \mu \times sgn(\epsilon_0) \times sgn(b_0). \quad \text{Equation 5}$$

$$G_{PRE}' \leftarrow G_{PRE} + \mu \times sgn(\epsilon_y) \times sgn(b_{-1}). \quad \text{Equation 6}$$

If a DFE is included in the equalizer configuration as shown in FIG. 2b, the updates for the DFE co-efficients 148 are straightforward as per equation 410. The DFE only equalizes post cursor ISI, and thus the index x in $sgn(b_x)$ can only be positive, and denotes bits that were received previous to the cursor $b_0$.

The step size $\mu$ can be selected as a value which is typically much smaller than the maximum co-efficient or gain value, and may be selected as a different value for each update equation 410, 412, 414, 416, and 418.

Figure 5:
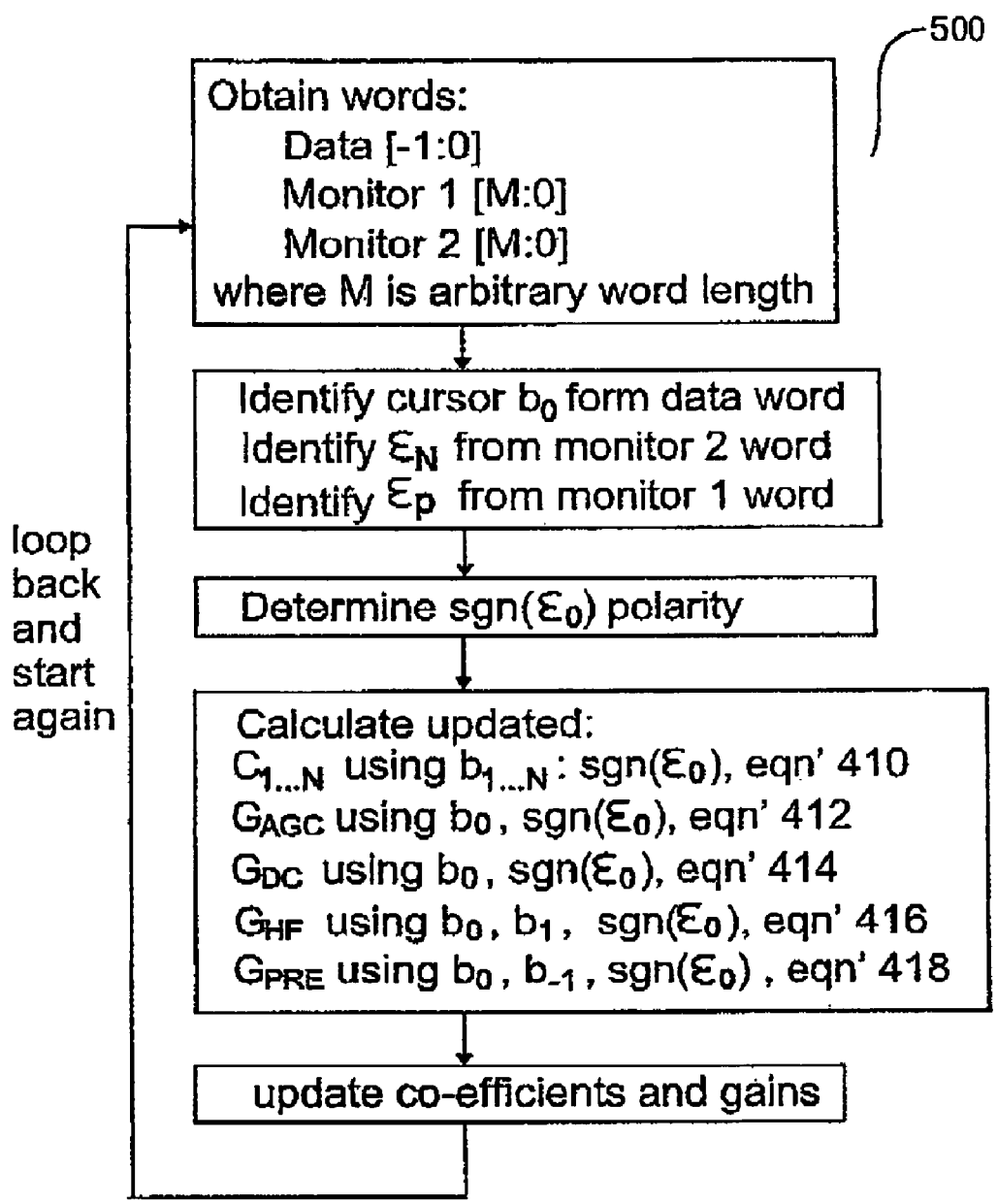
FIG. 5 outlines Co-Efficient and Gain update algorithm in accordance with the present invention.

FIG. 5 outlines a flow diagram 500 that shows the update algorithm that is used to adapt the various gains and co-efficients 324 used in the equalizer circuit 204 and enhanced equalizer 202 described in FIG. 2a and FIG. 2b respectively. All equations may be updated simultaneously, by iteration. The step size can be changed for each set of equations to increase the rate of convergence or improve the precision of the acting co-efficient or gain. The equalizer can be converged to the optimum setting for any number of channels.

What is claimed is:

1. A receiver based equalization apparatus for automatically eliminating inter-symbol interference caused by a serial communication channel for a binary, Non-Return-to-Zero (NRZ), incoming serial data stream without requiring transmit pre-equalization, comprising:
   i) a programmable continuous equalizer to condition said incoming serial data stream to produce an equalized continuous output serial data stream; and
   ii) control means operable to control said programmable continuous equalizer based on said incoming serial data stream;
   wherein said programmable continuous equalizer comprises two compensation stages, a post-cursor compensation stage cascaded with a pre-cursor compensation stage;
   wherein said post-cursor compensation stage is configured to provide two signal paths to condition the received incoming serial data stream, one signal path being a controllable pure gain stage, and the other signal path being an independently controllable pure gain stage coupled to a high-pass filter, a combined output of both gain stages being supplied to said pre-cursor compensation stage.

2. The apparatus of claim 1, wherein said pre-cursor compensation stage is configured to provide two signal paths to condition the incoming serial data stream, one signal path being a controllable pure gain stage and the other signal path being an independently controllable pure gain stage coupled with a delay element, the combined output of both representing said equalized continuous output serial data stream.

3. The apparatus of claim 1, wherein the control means comprises a data slicer, a positive offset monitor slicer and a negative offset monitor slicer, each slicer coupled to said equalized continuous output serial data stream for producing receive control parameters.

4. The apparatus of claim 1, wherein the control means comprises a data slicer providing input to a data demultiplexer, a positive offset monitor slicer providing input to a positive monitor demultiplexer, and a negative offset monitor slicer providing input to a negative monitor demultiplexer, each slicer are configured to be coupled to said equalized continuous output serial data stream, wherein the demultiplexers are configured to provide inputs for producing said receive control parameters.

5. The apparatus of claim 1, wherein the control means comprises a storage array to store data channel bits, a positive monitor storage array to store positive monitor channel bits, and a negative monitor storage array to store negative monitor channel bits, each said storage array being configured to store bits responsive to an output of a respective slicer coupled to said equalized continuous output serial data stream, wherein said receive control parameters are determined by values of the bits.

6. An equalization apparatus for automatically equalizing binary, Non-Return-to-Zero (NRZ), serial data stream over a communication channel comprising:
  i) a programmable receiver to receive an incoming serial data stream from the communication channel including:
    (a) a programmable post-cursor compensation stage to condition the received incoming serial data stream;
    (b) a programmable pre-cursor compensation stage to condition an output of said programmable post-cursor compensation stage;
    (c) a programmable decision feedback equalizer (DFE) stage to condition the output of said programmable post-cursor compensation stage to produce an equalized output serial data stream; and
  ii) a co-efficient and gain update block controller configured to be coupled to an output of said programmable receiver to produce control means to program said receiver based on said incoming serial data stream;
  wherein said programmable post-cursor compensation stage comprises:
    (a) a high-pass filter coupled to a controllable pure gain stage $G_{HF}$ to condition the received incoming serial data stream corresponding to a gain parameter $G_{HF}$;
    (b) a controllable pure gain stage $G_{DC}$ to condition the received incoming serial data stream corresponding to a gain parameter $G_{DC}$, whose output is summed with an output of the controllable pure gain stage $G_{HF}$ to form the output of said programmable post-cursor compensation stage;
    (c) a delay element coupled to a controllable pure gain stage $G_{AGC}$ to condition the output of said programmable post-cursor compensation stage corresponding to a gain parameter $G_{AGC}$; and
    (d) a controllable pure gain stage $G_{PRE}$ to condition the output of said programmable post-cursor compensation stage corresponding to a gain parameter $G_{PRE}$, whose output is summed with an output of said controllable pure gain stage $G_{AGC}$ to form an output of said programmable pre-cursor compensation stage.

7. The apparatus of claim 6, wherein said DFE stage comprises an N-tap programmable non-linear decision feedback equalizer (DFE) coupled to the output of the programmable pre-cursor compensation stage, providing N symbol spaced taps, each of which is configured to be programmed independently corresponding to a respective tap parameter $C_1, C_2 \ldots C_N$, wherein N is an integer.

8. The apparatus of claim 7, wherein said co-efficient and gain update block controller are configured to be coupled to the output of said programmable receiver to produce said gain and co-efficient parameters $G_{HF}, G_{AGC}, G_{PRE}, G_{DC}$, and $C_1, C_2, \ldots C_N$.

9. The apparatus of claim 6, wherein said co-efficient and gain update block controller further includes a data slicer, a positive offset monitor slicer, and a negative offset monitor slicer, each coupled to the output of said programmable receiver.

10. The apparatus of claim 6, wherein said co-efficient and gain update block controller includes a data slicer providing input to a data demultiplexer, a positive offset monitor slicer providing input to a positive monitor demultiplexer, and a negative offset monitor slicer providing input to a negative monitor demultiplexer, each slicer is configured to be coupled to said equalized output serial data stream, wherein the demultiplexers are configured to provide inputs for producing said gain and co-efficient parameters.

11. The apparatus of claim 6, wherein said co-efficient and gain update block controller includes a data storage array to store data channel bits, a positive monitor storage array to store positive monitor channel bits, and a negative monitor storage array to store negative monitor channel bits, each said storage array is configured to store bits responsive to an output of a respective slicer coupled to said equalized output serial data stream, wherein said gain and co-efficient parameters are determined by values of the bits.

12. A method for automatically adapting a receiver based equalizer to eliminate pre-cursor inter-symbol interference caused by a serial communication channel for a binary, Non-Return-to-Zero (NRZ), serial data stream without requiring transmit pre-equalization, the method comprising:
  at a channel equalization apparatus having a programmable equalizer:
    i) conditioning an incoming binary, NRZ, serial data stream received from the communication channel to produce an equalized output serial data stream in response to receive control parameters;
    ii) recovering the serial data stream from the equalized output serial data stream to obtain a recovered serial data stream;
    iii) producing error signals indicative of a difference between the equalized output serial data stream and a desired value for a given symbol; and
    iv) using the error signals in combination with said recovered serial data stream to produce said receive control parameters;
    v) over a plurality of symbol periods:
      storing the recovered serial data stream in a data channel storage array;
      storing the error signals in monitor channel storage arrays; and
    vi) generating the receive control parameters from selected portions of said stored recovered serial data stream and said stored error signals;
  wherein said error signals comprise positive offset error signals and negative offset error signals.

13. The method of claim 12 wherein said positive offset error signals are stored in a positive offset storage array and said negative offset error signals are stored in a negative offset storage array.

14. The method of claim 12 wherein said recovered serial data stream, and said error signals, are stored in separate storage arrays, are subsequently fed into a Co-Efficient and Gain Adaptation logic to generate said receive control parameters.

15. The method of claim 14 wherein said receive control parameters include $G_{HF}, G_{AGC}, G_{PRE}, G_{DC}$, and $C_1, C_2, \ldots C_N$, wherein $G_{HF}$ is a gain parameter of controllable gain stage conditioning the incoming serial data stream, $G_{AGC}$ is a gain parameter of gain stage conditioning an output of a post-cursor compensation stage, $G_{PRE}$ is another gain parameter of a gain stage conditioning the output of the post cursor compensation stage, and $G_{DC}$ is another gain parameter of a gain stage conditioning the incoming serial data stream, and $C_1, C_2, \ldots C_N$ are tap parameters of N-tap programmable decision feedback equalizer (DFE) coupled to an output of a pre-cursor compensation stage, wherein N is an integer.

16. The method of claim 15 wherein said Co-Efficient and Gain Adaptation logic uses a set of equations to generate co-efficient and gain updates to said receive control parameters.

17. The method of claim 16 wherein the co-efficient and gain updates generated by said Co-Efficient and Gain Adaptation logic are based on an approximation of the Least Mean Squares criterion, which is defined by $C_x' \leftarrow C_x + \mu \times \epsilon \times Dx$, wherein $C_x'$ is the co-efficient and gain update to a previous co-efficient and gain $C_x$, Dx is an analog amplitude of a given data bit, $\epsilon$ is a decimal parameter, and $\mu$ is a step size.

18. The method of claim 17 wherein the step size $\mu$ is selected to be an arbitrary discrete value that is optimized to increase a rate of convergence or improve a precision of said co-efficient or gain.

19. The method of claim 18 wherein $D_x$ is defined by a received binary data bit $b_x$, and wherein polarity of the received data bit $b_x$ defined by $sgn(b_x)$, the $sgn(b_x)$ being a sign function.

20. The method of claim 19 wherein if said data bit x is greater than zero and has a binary value "1", then the polarity of the received data bit $b_x$ is defined as $sgn(b_x)=+1$.

21. The method of claim 20 wherein if said data bit x is smaller than zero and has a binary value "0", said polarity of the received data bit $b_x$ is defined as $sgn(b_x)=-1$.

22. The method of claim 19 wherein, if said data bit $b_x$ is specifically associated with a cursor, then $sgn(b_x)=sgn(b_0)$.

23. The method of claim 19 wherein said decimal parameter $\epsilon$ is reduced to a polarity of a difference between a target signal amplitude and an actual signal amplitude for a given sampled data bit, and is defined by $sgn(\epsilon)$.

24. The method of claim 23 wherein if the actual signal amplitude is smaller than the target signal amplitude, then $sgn(\epsilon)=+1$.

25. The method of claim 24 wherein if the actual signal amplitude is larger than a desired or target signal amplitude, then $sgn(\epsilon)=-1$.

26. The method of claim 23 wherein if $sgn(\epsilon)$ is specifically associated with a selected cursor then $sgn(\epsilon)=sgn(\epsilon_0)$.

27. The method of claim 17 wherein said least mean squares criterion equation $C_x' \leftarrow C_x + \mu \times \epsilon \times Dx$ is approximated as a General Gain and Update Equation $C_x' \leftarrow C_x + \mu \times sgn(\epsilon_0) \times sgn(b_x)$, wherein $sgn(\epsilon_0)$ is a sign function of the decimal parameter $\epsilon$ associated with a selected cursor, and $sgn(b_x)$ is a polarity of received binary data bit $b_x$.

28. The method of claim 27 wherein said binary data bit $b_x$ within said data channel storage array is arbitrarily selected to represent a cursor ($b_0$), which in turn provides a reference point from which to compute the $sgn(b_x)$ parameters in said General Gain and Update Equation, and which also provides a bit location to extract the corresponding $sgn(\epsilon)$ information.

29. The method of claim 28 wherein value of said corresponding $sgn(\epsilon)$ is determined by evaluating error signals stored in a positive offset storage array and a negative offset storage array based on polarity of said cursor ($b_0$).

30. The method of claim 29 where if said cursor ($b_0$) has a positive polarity, then the positive offset storage array is used to obtain value of $sgn(\epsilon_0)$, and information in the negative offset storage array is discarded.

31. The method of claim 29 where if said cursor ($b_0$) has a negative polarity, then the negative offset storage array is used to obtain value of $sgn(\epsilon_0)$, and information in the positive offset storage array is discarded.

32. The method of claim 17 where the $G_{HF}$ is updated as follows: $G_{HF}' \leftarrow G_{HF} - \mu \times sgn(\epsilon_0) \times sgn(b_1)$, wherein $\mu$ is a step size, $sgn(\epsilon_0)$ is a sign function of the decimal parameter $\epsilon$ associated with a selected cursor, and $sgn(b_1)$ is a polarity of first post-cursor $b_1$.

33. The method of claim 17 where the $G_{DC}$ is updated as follows: $G_{DC}' \leftarrow G_{DC} + \mu \times sgn(\epsilon_0) \times sgn(b_0)$, wherein $\mu$ is a step size, $sgn(\epsilon_0)$ is a sign function of the decimal parameter $\epsilon$ associated with a selected cursor, and $sgn(b_0)$ is a polarity of a data bit associated with a cursor.

34. The method of claim 17 where the $G_{AGC}$ is updated as follows: $G_{AGC}' \leftarrow G_{AGC} + \mu \times sgn(\epsilon_0) \times sgn(b_0)$, wherein $\mu$ is a step size, $sgn(\epsilon_0)$ is a sign function of the decimal parameter $\epsilon$ associated with a selected cursor, and $sgn(b_0)$ is a polarity of a data bit associated with a cursor.

35. The method of claim 17 where the $G_{PRE}$ is updated as follows: $G_{PRE}' \leftarrow G_{PRE} + \mu \times sgn(\epsilon_0) \times sgn(b_{-1})$, wherein $\mu$ is a step size, $sgn(\epsilon_0)$ is a sign function of the decimal parameter $\epsilon$ associated with a selected cursor, and $sgn(b_{-1})$ is a polarity of first pre-cursor $b_1$.

* * * * *

UNITED STATES PATENT AND TRADEMARK OFFICE
CERTIFICATE OF CORRECTION

| | | |
|---|---|---|
| PATENT NO. | : 8,081,677 B2 | Page 1 of 1 |
| APPLICATION NO. | : 11/720024 | |
| DATED | : December 20, 2011 | |
| INVENTOR(S) | : Riccardo Badalone | |

It is certified that error appears in the above-identified patent and that said Letters Patent is hereby corrected as shown below:

In the Claims:

col. 6 line 55, claim 4: delete "are" and replace with --being--

Signed and Sealed this
Twenty-eighth Day of February, 2012

David J. Kappos
*Director of the United States Patent and Trademark Office*